May 20, 1958  J. L. HOWES  2,835,498
COLLET
Filed May 7, 1957
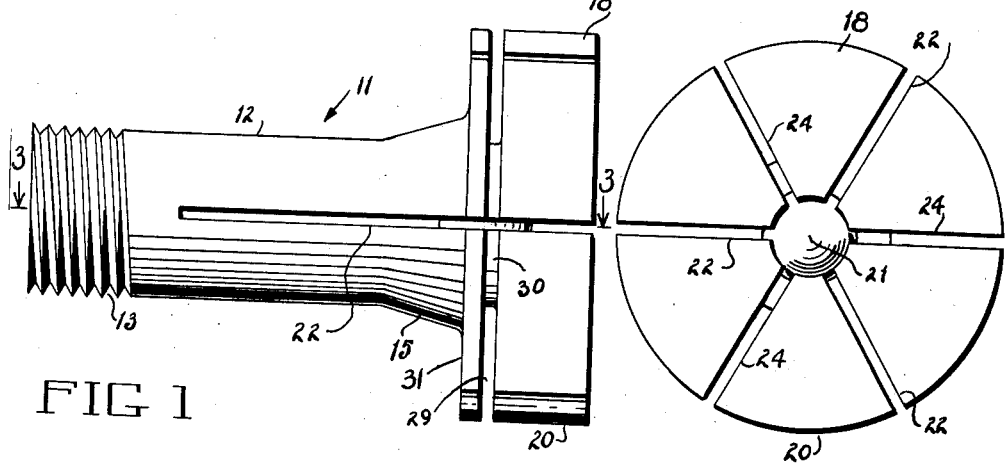
FIG 1
FIG 2
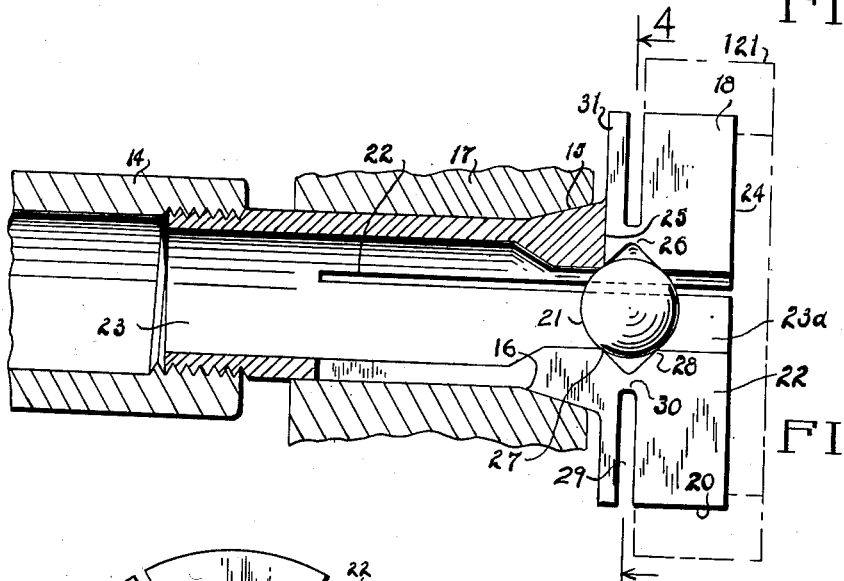
FIG 3
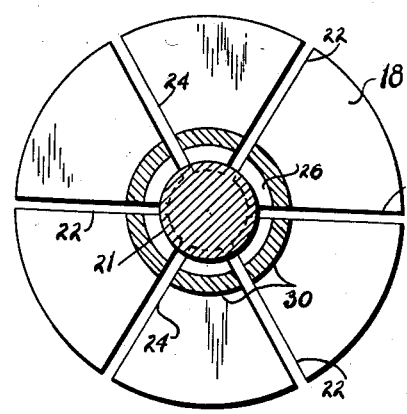
FIG 4
INVENTOR.
Jack L. Howes
BY
Fred N. Schwend

United States Patent Office 2,835,498
Patented May 20, 1958

2,835,498

COLLET

Jack L. Howes, La Puente, Calif.

Application May 7, 1957, Serial No. 657,611

7 Claims. (Cl. 279—51)

This invention relates to work holding collets or chucks for use in lathes, grinders, milling machines, etc., and has particular reference to expandable type collets or chucks for gripping the work pieces by engaging an internal bore in the latter.

The principal object of the present invention is to provide an improved expanding collet which will accurately grip the internal bore surface of a part.

Another object is to provide a highly accurate expanding collet having few parts.

Another object is to provide an expanding collet which requires relatively small actuating force to cause the same to firmly grip the work.

A further object is to provide a relatively inexpensive and yet highly accurate expanding collet.

The manner in which the above and other objects of the invention are accomplished will be readily understood on reference to the following specification when read in conjunction with the accompanying drawings, wherein:

Fig. 1 is a side elevational view of an expanding collet embodying a preferred form of the present invention.

Fig. 2 is an end view of the collet.

Fig. 3 is a longitudinal sectional view of the collet, illustrating the same mounted in a collet holding spindle and attached to a draw bar.

Fig. 4 is a transverse sectional view through the collet taken along the line 4—4 of Fig. 3.

The collet, generally indicated at 11, comprises a one-piece body having a tubular shank portion 12 which is threaded at 13 for attachment to one end of a draw bar 14.

The shank portion includes a conical section 15 for engagement with a mating conical section 16 formed in a collet holding spindle, partly illustrated at 17, of a work forming machine.

A head section 18 is formed integral with the shank 12 to provide a work gripping surface 20 effective to grip the interior bore of a work piece 121.

The outer diameter and contour of the head section 18 may be formed as desired to properly fit the bore of the work piece.

Three longitudinally extending slots 22 are cut in the collet. Such slots extend radially from the inner bore 23 of the collet and are equi-angularly spaced from each other. Such slots extend completely through the head 18 and through the major portion of the shank 12, terminating adjacent the threaded end 13 to form three resilient, radially movable jaw members.

Three additional longitudinally extending shorter slots 24 are cut in the head section 18 only. These slots also extend radially, between the slots 22, and terminate at 25 adjacent the conical section 16.

The bore 23 is reduced in diameter at 23a in the region of the head section 18, and an annular groove 26 is cut in such small bore. The latter groove has its sides, when seen in cross section, converging at an included angle of approximately 90°.

A spherical ball 21, forming a wedging element, is snapped into the groove 26 so that its sides engage ridges or ball socket sections 27 and 28 formed at the intersections of the groove sides and the inner bore 23a.

A circumferentially extending outer annular groove 29 is cut in the head section 18 and is aligned or substantially aligned with the apex of the internal annular groove sides (as seen in cross section) to leave somewhat weakened arcuate web sections 30 in the jaw members of such area that portions of the jaw members to the right of the groove 29 may be flexed about such web sections.

In operation, the collet is fitted in the collet holding spindle and threadably attached to the draw bar 14. The work piece, i. e. 121, is fitted over the head section 18 and the draw bar is operated to draw the collet inwardly, to the left, relative to the spindle. As the jaw members are cammed radially inward by engagement of the conical sections 15 with the conical formation 16 on the spindle, the ridge 27 of the internal annular groove applies a camming force to the ball, forcing the latter to the right. Thereupon, the ball, in turn, applies a camming force against the ridge 28, to force the segments of the jaw members forming the head section 18 radially outward about the weakened or web sections 30 so that the gripping surface 20 may expand sufficiently to grip the internal bore surface of the work piece.

It will be noted that the ball 21 also prevents radial collapsing of the jaw members at their right hand ends as the collet is drawn into the spindle.

The resulting flange 31 on the head section, to the left of the groove 29, is ineffective to expand. However, if the surface 20 is turned down to accommodate work of smaller diameter than that shown, the flange will be effective to locate the work longitudinally on the collet.

It will be noted that by locating the grooves 26 and 29 closer to the right hand end of the collet than as shown, a greater gripping force may be obtained although the degree of radial expansion of the jaw members will be correspondingly reduced.

Although I have described my invention in detail in its preferred embodiment and have therefore utilized certain specific terms and languages herein, it is to be understood that the present disclosure is illustrative rather than restrictive and that changes and modifications may be resorted to without departing from the spirit or scope of the claims appended hereto.

What I desire to secure by United States Letters Patent is:

1. An expanding collet comprising a tubular body having a plurality of longitudinally extending slots therein extending from one end thereof to adjacent the opposite end to form resilient radially movable jaw members, an internal annular groove in said body, and a wedging element in said internal groove and engaging the opposite sides thereof, the portions of said jaw members adjacent said groove being weaker than the remaining portions thereof, said jaw members when pressed radially inward on the side of said wedging element nearest said opposite end causing the side of said internal groove nearest said opposite end to force said wedging element longitudinally toward said one end whereby said wedging element is effective to cam the portions of said jaw members nearest said one end radially outward about said weaker portions.

2. An expanding collet comprising a tubular body having a plurality of longitudinally extending slots therein extending from one end thereof to adjacent the opposite end to form resilient radially movable jaw members, an internal annular groove in said body, and a ball held in said internal groove, the portions of said jaw members adjacent said groove being weaker than the remaining portions thereof, said jaw members when pressed radially inward on the side of said ball nearest said opposite end causing the side of said internal groove nearest said opposite end to cam said ball longitudinally whereby said ball is effective to cam the portions of said jaw members nearest said one end radially about said weaker portions.

3. An expanding collet comprising a tubular body having a plurality of longitudinally extending slots therein extending from one end thereof to adjacent the opposite end to form resilient radially movable jaw members, an internal annular groove in said body, an external annular groove in said body at least substantially aligned with said internal groove to form weakened web sections in said jaw members, and a ball located in said internal groove, said jaw members when pressed radially inward on the side of said ball nearest said opposite end causing the side of said internal groove nearest said opposite end to cam said ball longitudinally whereby said ball is effective to cam the portions of said jaw members nearest said one end radially outward about said web portions.

4. An expanding collet comprising a tubular body having a plurality of longitudinally extending slots therein extending from one end thereof to adjacent the opposite end to form resilient radially movable jaw members, an internal annular groove in said body, an external annular groove in said body aligned with said internal groove to form weakened web sections in said jaw members, and a wedging element in said internal groove, said wedging element engaging the opposite sides of said groove, said jaw members when pressed radially inward on the side of said wedging element nearest said opposite side causing the side of said internal groove nearest said opposite end to move said wedging element longitudinally toward said one end whereby said wedging element is effective to cam the portions of said jaw members nearest said one end outward radially about said web portions.

5. An expanding collet comprising a plurality of longitudinally extending resilient jaw members of arcuate cross section held in parallel relation at one end to form a tubular body, contiguously extending internal grooves in said jaw members forming an internal annular groove, contiguously extending external grooves in said jaw member, said external grooves being aligned with said internal grooves to form weakened web sections, and a ball held in said internal annular groove, said jaw members when pressed radially inward on the side of said ball nearest said one end causing the side of said internal annular groove at said one side of said ball to cam said ball longitudinally whereby said ball is effective to cam the portions of said jaw members on the opposite side of said ball radially outward about said web sections.

6. An expanding collet comprising a plurality of longitudinally extending resilient jaw members of arcuate cross section held in parallel relation at one end to form a tubular body, contiguously extending internal grooves in said jaw members forming an internal annular groove, the portions of said jaw members adjacent said internal grooves being weaker than the remaining portions thereof, and a ball in said internal annular groove, said jaw members when pressed radially inward on the side of said members nearest said one end causing the side of said internal annular groove at said one side of said ball to cam said ball longitudinally whereby said ball is effective to cam the portions of said jaw members on the opposite side of said ball outwardly about said weakened portions.

7. An expanding collet comprising a tubular body having a plurality of longitudinally extending slots therein extending from one end thereof to adjacent the opposite end to form resilient radially movable jaw members, an internal annular groove in said body, and a ball held in said annular groove and engaging the opposite sides thereof, the portions of said jaw members adjacent said groove being weaker than the remaining portions thereof, said body having a conical surface on the side of said ball nearest said opposite end for engagement with a mating conical surface of a collet holder whereby to press said jaw members inward radially, said jaw members when pressed inward radially on the side of said ball nearest said opposite end causing the side of said internal groove nearest said opposite end to cam said ball longitudinally whereby said ball is effective to cam the portions of said jaw members nearest said one end outward radially about said weakened portions.

References Cited in the file of this patent
UNITED STATES PATENTS

| | | |
|---|---|---|
| 2,389,366 | Jones | Nov. 20, 1945 |
| 2,406,444 | Stoner | Aug. 27, 1946 |